United States Patent
Karlov et al.

(10) Patent No.: US 9,230,335 B2
(45) Date of Patent: Jan. 5, 2016

(54) VIDEO-ASSISTED TARGET LOCATION

(71) Applicant: RAYTHEON COMPANY, Waltham, MA (US)

(72) Inventors: Valeri I. Karlov, Stony Brook, NY (US); Adam C. Durst, Stony Brook, NY (US); Patrick E. Barry, Port Jefferson, NY (US)

(73) Assignee: Raytheon Company, Waltham, MA (US)

(*) Notice: Subject to any disclaimer, the term of this patent is extended or adjusted under 35 U.S.C. 154(b) by 350 days.

(21) Appl. No.: 13/626,978

(22) Filed: Sep. 26, 2012

(65) Prior Publication Data

US 2014/0085462 A1    Mar. 27, 2014

(51) Int. Cl.
*G06T 7/00* (2006.01)
*G06T 7/20* (2006.01)

(52) U.S. Cl.
CPC ............... *G06T 7/208* (2013.01); *G06T 7/0071* (2013.01); *G06T 2207/10016* (2013.01); *G06T 2207/10032* (2013.01); *G06T 2207/30212* (2013.01); *G06T 2207/30244* (2013.01)

(58) Field of Classification Search
CPC ....... H04N 7/181; H04N 7/183; H04N 7/186; H04N 7/18; H04N 7/188; G08B 13/19656
USPC .......................................................... 348/143
See application file for complete search history.

(56) References Cited

U.S. PATENT DOCUMENTS 6,388,611 B1   5/2002  Dillman
8,521,339 B2 *  8/2013  Gariepy et al. ................... 701/2

OTHER PUBLICATIONS

Kelcey et al. "Sensor Correction and Radiometric Calibration of a 6-Band Multispectral Imaging Sensor for UAV Remote Sensing" International Archives of the Photogrammetry, Remote Sensing and Spatial Information Sciences, vol. XXXIX-B1, 2012 XXII ISPRS Congress, Aug. 25-Sep. 1, 2012, Melbourne, Australia.*
Suzuki et al. "Development of a SIFT based Monocular EKF-SLAM Algorithm for a Small Unmanned Aerial Vehicle", SICE Annual Conference 2011, Sep. 13-18, 2011.*
Mallick, M., Geolocation using Video Sensor Measurements, Conference Publication, Information Fusion, 10th International Conference, 2007, pp. 1-8.
Le et al., Video-Assisted Global Positioning in Terrain Navigation: Hough Transform Solution, 2002, ICVGIP, 8 pages.

(Continued)

*Primary Examiner* — Jay Au Patel
*Assistant Examiner* — Frank Huang
(74) *Attorney, Agent, or Firm* — Burns & Levinson LLP; Joseph M. Maraia (57) ABSTRACT

A method for locating features in a field of view of an imaging sensor that includes receiving image data from the field of view of an imaging sensor, wherein the image data includes a plurality of image frames. The method also includes receiving three-dimensional position measurements, in an absolute coordinate system, for the imaging sensor at the point in time each image frame is acquired and identifying one or more features in each of the image frames. The method also includes determining position and velocity of the one or more features in the image frames based on changes to the one or more features between the image frames and determining three-dimensional positions of the one or more features in the image frames based on the received three-dimensional position measurements for the imaging sensor and position and velocity of the one or more features in the image frames.

22 Claims, 5 Drawing Sheets

(56) References Cited

OTHER PUBLICATIONS

Veth et al., Tightly-Coupled INS, GPS, and Imaging Sensors for Precision Geolocation, Proceedings of the 2008 National Technical Meeting of the Institute of Navigation, Jan. 28-30, 2008, San Diego, California.

Barber et al., Vision-based Target Geo-location using a Fixed-wing Miniature Air Vehicle, Journal of Intelligent and Robotic Systems, Submitted Aug. 24, 2006, 11 pages.

Robbins, S., 3D SLAM: Simultaneous Localization and Mapping in 3D, The MITRE Corporation (2007), 10 pages.

Robbins, S., 3D SLAM: Simultaneous Localization and Mapping in 3D, The MITRE Corporation (2009), 9 pages.

T. Suzuki, et al., "Development of a SIFT based Monocular EKF-SALAM Algorithm for a Small Unmanned Aerial Vehicle," Advance Research Institute for Science and Engineering, Waseda University, Tokyo, Japan, Sep. 13, 2011, pp. 1656-1659.

C.H. Hsiao, et al., "Achieving Undelayed Initialization in Monocular SLAM with Generalized Objects Using Velocity Estimate-based Classification," IEEE International Conference on Robotics and Automation Shanghai International Conference Center, May 9, 2011, pp. 4060-4066.

M. Kleinert, et al., "Inertial Aided Monocular SLAM for GPS-Denied Navigation," IEEE International Conference on Multisensor Fusion and Integration for Intelligent Systems, University of Utah, Salt Lake City, Sep. 5, 2010, pp. 20-25.

J. Artieda, et al., "Visual 3-D SLAM from UAVs," Journal of Intelligent and Robotic Systems; Theory and Applications, (Incorporating Mechatronic Systems Engineering), Kluwer Academic Publishers., May 30, 2008, vol. 55, No. 4-5, pp. 305-314.

\* cited by examiner

VIDEO-ASSISTED TARGET LOCATION

BACKGROUND

Current targeting systems rely on inertial measurement units to measure the line of sight between a targeting system and the ground to determine the location of a target. Performance of these systems is limited by measurement errors. A need therefore exists for improved methods and systems for locating targets.

SUMMARY

The technology described herein relates to determining target locations using video sensor measurements to estimate the three-dimensional location of targets and video sensors used in the technology.

One embodiment is a method for locating features in a field of view of an imaging sensor. The method includes receiving a first image frame for a field of view of an imaging sensor at a first time and receiving a three-dimensional position measurement, in an absolute coordinate system, for the imaging sensor at the first time. The method also includes identifying one or more features in the first image frame. The method also includes receiving a second image frame for the field of view of the imaging sensor at a second time. The method also includes receiving a three-dimensional position measurement, in an absolute coordinate system, for the imaging sensor at the second time. The method also includes identifying one or more features in the second image frame. The method also includes determining position and velocity of the one or more features in the second image frame based on changes to the one or more features in the image frames between the first and second time. The method also includes determining three-dimensional positions of one or more of the features in the first and second image frames based on the received three-dimensional position measurements for the imaging sensor for the first and second time and position and velocity of the one or more features in the first and second image frames.

In some embodiments, the method includes determining three-dimensional positions of the one or more features in the first and second image frames using a non-linear estimation method. In some embodiments, one or more features identified in the second image frame were not identified in the first image frame. In some embodiments, one or more of the one or more features are moving with respect to the absolute coordinate system. In some embodiments, the method includes generating a three-dimensional grid over the second image frame based on the three-dimensional positions of features in the second image.

In some embodiments, determining three-dimensional positions of one or more of the features in the first and second image frames is determined based on the received three-dimensional position measurements for the imaging sensor for the first and second time, position and velocity of the one or more features in the first and second image frames, and azimuth and elevation measurements of the imaging sensor relative to one or more of the features in an image frame. In some embodiments, the method includes receiving radiometric data for features in the image frames and overlaying the radiometric data on the three-dimensional grid. In some embodiments, the method includes determining azimuth and elevation of the imaging sensor relative to one of the features in the image frames based on the received three-dimensional position measurements for the imaging sensor for the first and second time and position and velocity of the one or more features in the first and second image frames.

In some embodiments, the method includes a) receiving a third image frame for the field of view of the imaging sensor at a third time, b) identifying one or more features in the third image frame, c) determining position and velocity of the one or more features in the third image frame based on changes to the one or more features in the image frames between the first, second and third time, and determining three-dimensional positions of one or more of the features in the third image frame based on the position and velocity of the one or more features in the first, second, and third image frames and received three-dimensional position measurements for the imaging sensor for the first, second, and third times.

In some embodiments, the method includes smoothing the position and velocity values of the one or more features in the second image frame to reduce measurement errors prior to performing the step of determining three-dimensional positions of one or more of the features in the first and second image frames.

Another embodiment features a system for locating features in a field of view of an imaging sensor. The system includes a processor and a memory. The memory includes code representing instructions that when executed cause the processor to receive a first image frame for a field of view of an imaging sensor at a first time. The memory includes code representing instructions that when executed also causes the processor to receive a three-dimensional position measurement, in an absolute coordinate system, for the imaging sensor at the first time. The memory includes code representing instructions that when executed also causes the processor to identify one or more features in the first image frame. The memory includes code representing instructions that when executed also causes the processor to receive a second image frame for the field of view of the imaging sensor at a second time. The memory includes code representing instructions that when executed also causes the processor to receive a three-dimensional position measurement, in an absolute coordinate system, for the imaging sensor at the second time. The memory includes code representing instructions that when executed also causes the processor to identify one or more features in the second image frame. The memory includes code representing instructions that when executed also causes the processor to determine position and velocity of the one or more features in the second image frame based on changes to the one or more features in the image frames between the first and second time. The memory includes code representing instructions that when executed also causes the processor to determine three-dimensional positions of one or more of the features in the first and second image frames based on the received three-dimensional position measurements for the imaging sensor for the first and second time and position and velocity of the one or more features in the first and second image frames.

In some embodiments, the memory includes code representing instructions that when executed cause the processor to determine three-dimensional positions of the one or more features in the first and second image frames using a non-linear estimation method. In some embodiments, the memory includes code representing instructions that when executed cause the processor to generate a three-dimensional grid over the second image frame based on the three-dimensional positions of features in the second image.

In some embodiments, the memory includes code representing instructions that when executed cause the processor to determine three-dimensional positions of one or more of the features in the first and second image frames based on the received three-dimensional position measurements for the imaging sensor for the first and second time, position and velocity of the one or more features in the first and second image frames, and azimuth and elevation measurements of the imaging sensor relative to one or more of the features in an image frame. In some embodiments, the memory includes code representing instructions that when executed cause the processor to receive radiometric data for features in the image frames and overlay the radiometric data on the three-dimensional grid.

In some embodiments, the memory includes code representing instructions that when executed cause the processor to determine azimuth and elevation of the imaging sensor relative to one of the features in the image frames based on the received three-dimensional position measurements for the imaging sensor for the first and second time and position and velocity of the one or more features in the first and second image frames. In some embodiments, the memory includes code representing instructions that when executed cause the processor to smooth the position and velocity values of the one or more features in the second image frame to reduce measurement errors prior to performing the step of determining three-dimensional positions of one or more of the features in the first and second image frames.

Another embodiment features a method for locating features in a field of view of an imaging sensor. The method includes receiving image data from the field of view of an imaging sensor, wherein the image data includes a plurality of image frames and each image frame is acquired at a different point in time. The method includes receiving three-dimensional position measurements, in an absolute coordinate system, for the imaging sensor at the point in time each image frame is acquired. The method includes identifying one or more features in each of the image frames. The method includes determining position and velocity of the one or more features in the image frames based on changes to the one or more features between the image frames. The method includes determining three-dimensional positions of the one or more features in the image frames based on the received three-dimensional position measurements for the imaging sensor and position and velocity of the one or more features in the image frames.

The target location methods and systems described herein (hereinafter "technology") can provide one or more of the following advantages. One advantage of the technology is that the use of video data from imaging sensors improves the ability to locate targets in an earth-fixed system (geo-location of targets). Another advantage of the technology is that the use of the video data allows the system to accurately determine the three-dimensional position of features in image frames of the video data. Another advantage of the technology is that the use of video data enables the target location system to determine the geo-location position and velocity of features in image frames of the video data as a function of time. Another advantage of the technology is that use of video data allows the system to determine azimuth and elevation values for the image sensor used to acquire the video data.

Other aspects and advantages of the current invention will become apparent from the following detailed description, taken in conjunction with the accompanying drawings, illustrating the principles of the invention by way of example only.

BRIEF DESCRIPTION OF THE DRAWINGS

The foregoing features of various embodiments of the invention will be more readily understood by reference to the following detailed descriptions in the accompanying drawings.

DETAILED DESCRIPTION OF ILLUSTRATIVE EMBODIMENTS

Figure 1:
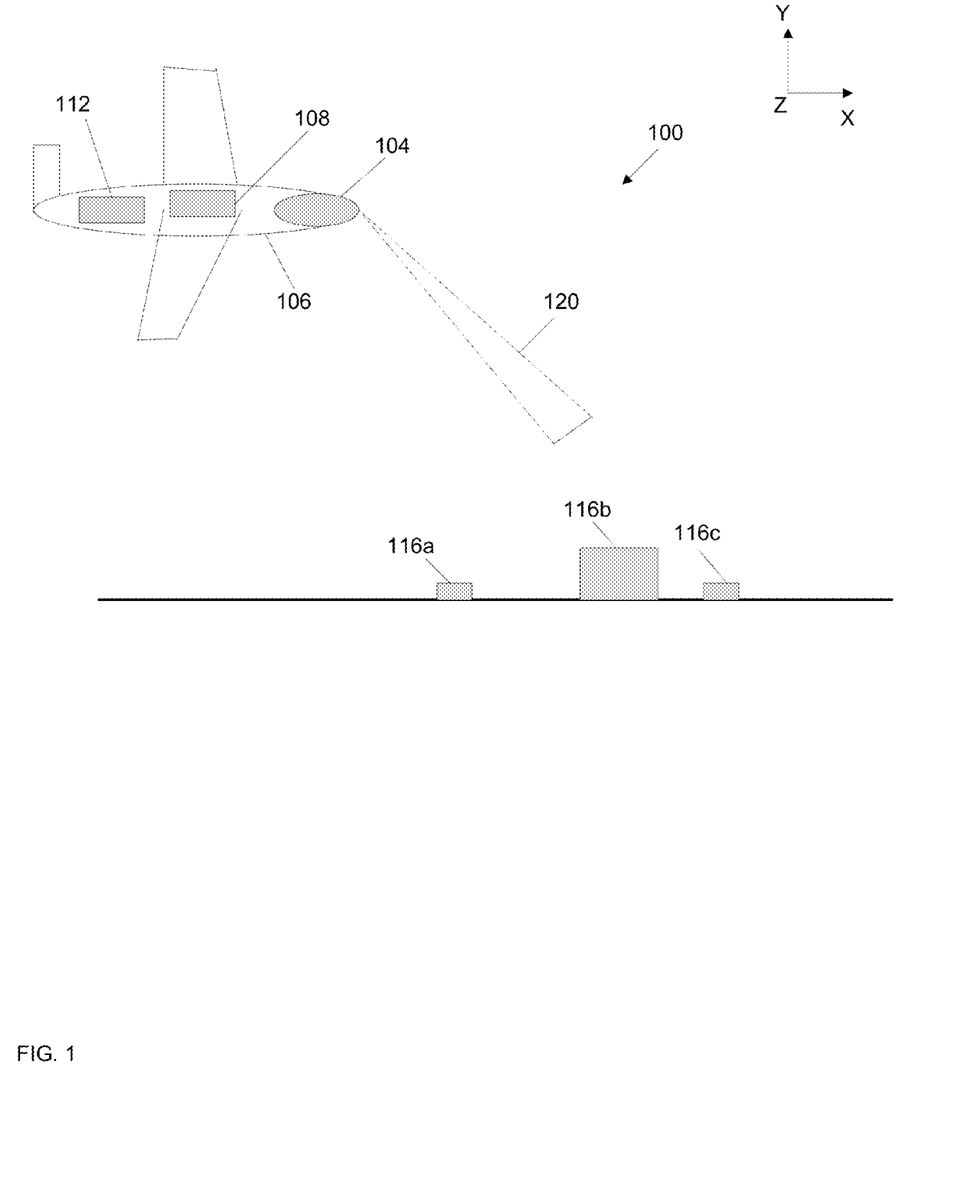
FIG. 1 is a schematic illustration of a system for locating features in the field of view of an imaging sensor, according to an illustrative embodiment.

FIG. 1 is a schematic illustration of a system 100 for locating features in the field of view 120 of an imaging sensor 104, according to an illustrative embodiment. In this embodiment, the imaging sensor 104 is coupled to an aircraft 106; however, the imaging sensor 104 can be coupled to or otherwise associated with alternative mobile (e.g., satellites) or immobile (e.g., towers, tripods) structures in alternative embodiments. The system 100 also includes an inertial measurement unit (IMU) 108 that measures the global-frame three-dimensional position (X,Y,Z) of the aircraft 106. The system also includes a computing device 112, that includes a processor to process the video data acquired by the imaging sensor 104 and the IMU data of the IMU 108 to locate one or more features 116a, 116b, 116c (generally 116) in the field of view 120 of the imaging sensor 104.

Figure 2:
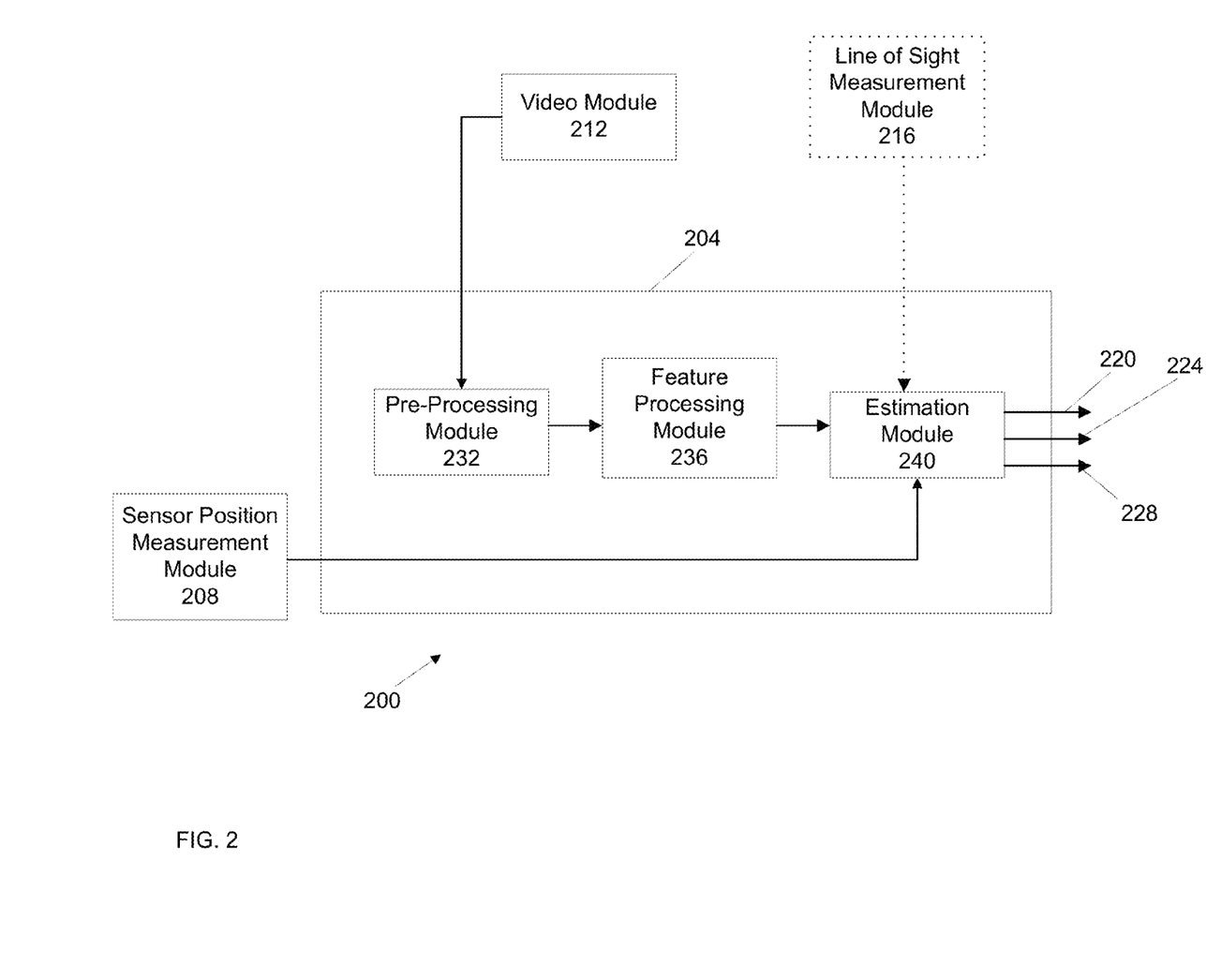
FIG. 2 is a block diagram of a system for locating features in the field of view of an imaging sensor, according to an illustrative embodiment.

FIG. 2 is a block diagram 200 of a system for locating features in the field of view of an imaging sensor (e.g., the imaging sensor 104 of FIG. 1). A target location module 204 processes data received from a sensor position measurement module 208, a video module 212, and an optional line of sight measurement module 216. The target location module 204 outputs one or more types of location data (sensor position 220, position of one or more features in the field of view of the imaging sensor 224, and/or line of sight data for the imaging sensor 228) based on the received data.

The target location module 204 includes a pre-processing module 232, a feature processing module 236, and an estimation module 240. The pre-processing module 232 performs image processing techniques (e.g., pixel processing, gain correction) to condition the video data received from the video module 212. The video data is a series of video image frames acquired by and received from the imaging sensor 104. In some embodiments, the image frames are acquired at a fixed rate (e.g., 60 Hz, 120 Hz) capture rate. Each frame is composed of a plurality pixels (e.g., 1024×1024; 2048×2048; 2048×1024). Each pixel has an intensity value corresponding to the intensity of the image frame at the pixel location. The image frames can be grayscale, color, or any other representation of the electromagnetic spectrum (e.g., infrared, near infrared, x-ray) that the specific imaging sensor is able to acquire.

Pre-processing the video data improves the accuracy of the system and reduces its sensitivity to, for example, spurious signals acquired by the imaging sensor 104 or errors in the video data. The pre-processing module 232 can, for example, remove dead pixels or correct signal level/intensity gain for the image frames in the video data. In some embodiments, dead pixels are removed using algorithms that detect and remove outlier pixels. Outlier pixels can be, for example, pixels having intensity values that are very large or very small compared with computed statistics of an image frame or compared with predefined values selected empirically by an operator. In some embodiments, signal level/intensity gain for the image frames is corrected by calibrating the pixel gains in the detector. The pixel gains can be calibrated by moving the focal plane over a uniform background image frame and normalizing the pixel gains by the average value of the pixel signal levels/intensity. The pre-processing module 232 provides the processed video data to the feature processing module 236.

Figure 3:
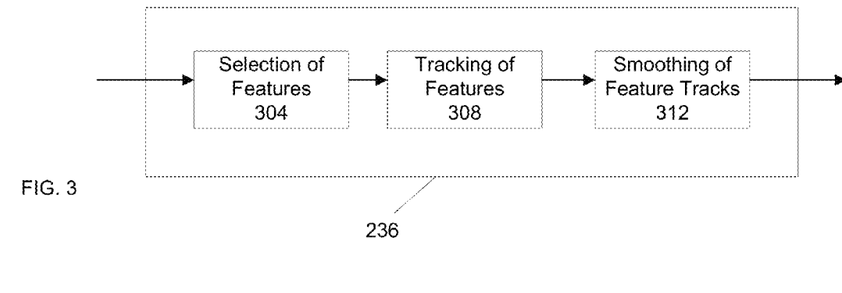
FIG. 3 is a block diagram of a module for processing features in image frames, according to an illustrative embodiment.

The feature processing module 236 transforms the video data into coordinate values and/or velocity values of features in the image frames of the video data. The feature processing module 236 includes one or more modules to transform the video data prior to providing the video data, position data, and velocity data to the estimation module 240. FIG. 3 is a block diagram of exemplary modules used by feature processing module 236 in some embodiments. The feature processing module 236 includes a module 304 to select features, a module 308 to track the features as a function of time, and a module 312 to smooth the feature tracks to reduce measurement errors.

In some embodiments, the feature processing module 236 automatically selects features in the image frames based on one or more techniques that are known to those skilled in the art. In some embodiments, an operator is provided with the video data to identify features (e.g., by using a mouse to select locations in image frames that the operator wishes to designate as a feature to track). In these later embodiments, the feature processing module 236 uses the operator input to select the features.

In some embodiments, the feature processing module 236 selects features (304) based on, for example, maximum variation of pixel contrast in local portions of an image frame, corner detection methods applied to the image frames, or variance estimation methods. The maximum variation of contrast is useful in identifying corners, small objects, or other features where there is some discontinuity between adjacent pixels, or groups of pixels, in the image frames. While feature selection can be performed with a high level of precision, it is not required. Because the system tracks features from frame to frame, there is a small change in viewing angles for practically the same scene conditions, and therefore, the system performance is generally robust to such changes. In some embodiments, some features may not be present or identified in each of the image frames. Some features may be temporarily obscured, or may exit the field of view associated with the image frame. The methods described will start tracking features that come back into the field of view of the system.

Features are defined as a geometric construct of some number of pixels. In some embodiments, a feature is defined as the center of a circle with radius (R) (e.g., some number of pixels, for example, between 1-10 pixels or 1-25 pixels). The center of the feature is then treated as invariant to projective transformation. The radius is adaptive and is chosen as a trade-off between localization-to-point (which is important for estimation of feature position) and expansion-to-area (which is important for registration of the feature in an image). The radius of the feature is usually chosen to be relatively smaller for small leaning or angled features because the features move due to three-dimensional mapping effects and it is often beneficial to separate them from the stationary background. Each feature's pixels are weighted by a Gaussian to allow for a smooth decay of the feature to its boundary.

After the features are selected, the feature processing module 236 tracks the features using a feature tracking module 308. In some embodiments, the feature processing module 236 implements an image registration technique to track the features. In some embodiments, two processes are implemented for registration: 1) sequential registration from frame to frame to measure the velocity of the features (producing a virtual gyro measurement); and, 2) absolute registration from frame to frame to measure positions of features (producing a virtual gimbal resolver measurement). In some embodiments, the feature processing module also performs an affine compensation step to account for changes in 3D perspective of features. The affine compensation step is a mathematical transform that preserves straight lines and ratios of distances between points lying on a straight line. The affine compensation step is a correction that is performed due to changes in viewing angle that may occur between frames. The step corrects for, for example, translation, rotation and shearing that may occur between frames. The affine transformation is performed at every specified frame (e.g., each $30^{th}$ frame) when changes in the appearance of the same feature due to 3D perspective becomes noticeable and needs to be corrected for better registration of the feature in the X-Y coordinates of the focal plane.

One embodiment of a registration algorithm is based on correlation of a feature's pixels with local pixels in another frame to find the best matching shift in an X-Y coordinate system. The method includes trying to minimize the difference between the intensities of the feature pixels in one frame relative to the intensities of the feature pixels in another frame. The method involves identifying the preferred shift (e.g., smallest shift) in a least squares sense. In some embodiments, a feature's local areas are resampled (×3-5) via bicubic interpolation and a finer grid is used for finding the best match. At this stage a simple grid search algorithm is used which minimizes the least-squares (LS) norm between the two resampled images by shifting one with respect another. In some embodiments, a parabolic local fit of the LS norm surface around the grid-based minimum is performed in order to further improve the accuracy of the global minimum (the best shift in X-Y for image registration). This results in accuracy of about $\frac{1}{10}$-th of a pixel or better. The feature tracking and registration can track not only stationary features but also moving features defined on, for example, targets such as cars, trains, or planes.

The feature processing module 236 then smoothes the feature tracks with smoothing module 312 before providing the feature track information to the estimation module 240. Various smoothing algorithms or filters can be employed to perform data smoothing to improve the efficiency of the system and reduce sensitivity to anomalies in the data. In some embodiments, smoothing of features' trajectories is carried out via a Savitzky-Golay filter that performs a local polynomial regression on a series of values in a specified time window (e.g., the position values of the features over a predetermined period of time).

Figure 4:
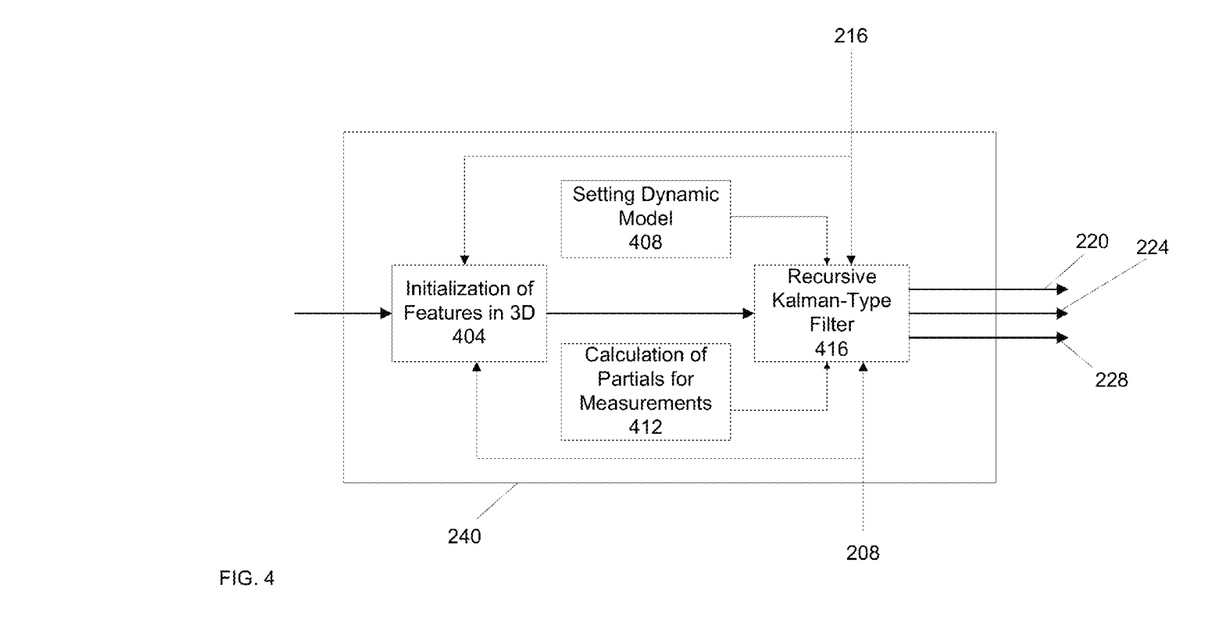
FIG. 4 is a block diagram of a module for estimating positions of features in image frames, according to an illustrative embodiment.

The sensor position measurement module 208 outputs the global-frame three-dimensional position (X, Y, Z) of the aircraft 106 measured by the IMU 108. The position is provided to the estimation module 220. The estimation module 220 receives the feature tracks (position and velocity data) for the features in the image frames and the output of the sensor position measurement module 208. In some embodiments, the system includes the optional line of sight measurement module 216 which can also be provided to the estimation module. The line of sight measurement module provides azimuth and elevation measurements to the estimation module. Both the sensor position measurement module 208 and the optional line of sight measurement module 216 provide measurements to the estimation module 240 to be processed by the module 404 (Initialization of Features in 3D) and by the module 416 (Recursive Kalman-Type Filter).

The estimation module 240 includes one or more modules to estimate one or more types of location data (sensor position 220, position of one or more features in the field of view of the imaging sensor 224, and/or line of sight data for the imaging sensor 228). FIG. 4 is a block diagram of exemplary modules used by estimation module 236 in some embodiments. In this embodiment, the estimation module 240 includes an initialization module 404, a model generation module 408, a partials calculation module 412, and a recursion module 416. Module 412 outputs the matrix H which is present in Equations 12-14.

The estimation of 3D positions of features as well as estimation of sensor positions and line-of-sight (LOS) is performed by solving a non-linear estimation problem. The estimation module 240 uses feature track information (position and velocity data) for the features in the image frames and the output of the sensor position measurement module 208. The first step in solving the non-linear estimation problem is initialization of the feature positions in 3D (latitude, longitude, altitude). The initialization module 404 does this by finding the feature correspondences in two (or more) frames and then intersecting the lines-of-sights using a least-square fit. When the feature positions are initialized, one can linearize the measurement equations in the vicinity of these initial estimates (reference values). Thereby, the measurements for sensor positions from GPS/INS and LOS are also used as the reference values in the linearization process.

The estimation module 240 implements a dynamic estimation process that processes the incoming data in real time. It is formulated (after linearization) in the form of a recursive Kalman-type filter. The filter is implemented by recursion module 416. Model generation module 408 sets the initial conditions of a linearized dynamic model in accordance with:

$$\Delta X_\Sigma(t+\Delta t) = \Phi(t,\Delta t)\Delta X_\Sigma(t) + F(t)\xi(t) \qquad \text{EQN. 1}$$

where t is the time for the current image frame, and $\Delta t$ is the time step (interval between image frames. A linearized measurement model is then generated in accordance with:

$$\Delta y_\Sigma(t) = H(t)\Delta x_\Sigma(t) + \eta(t) \qquad \text{EQN. 2}$$

The extended state-vector $\Delta X_\Sigma$ comprises the following blocks (all values are presented as deviations of the actual values from their reference ones):

$$\Delta X_\Sigma = \begin{bmatrix} \Delta p \\ \Delta s \end{bmatrix} \qquad \text{EQN. 3}$$

$$\Delta p = \begin{bmatrix} \Delta p_1 \\ \vdots \\ \Delta p_n \end{bmatrix} \qquad \text{EQN. 4}$$

$$\Delta p_i^{stat} = \begin{bmatrix} \Delta x_i \\ \Delta y_i \\ \Delta z_i \end{bmatrix} \qquad \text{EQN. 5}$$

$$\Delta p_i^{mov} = \begin{bmatrix} \Delta x_i \\ \Delta y_i \\ \Delta z_i \\ \Delta \dot{x}_i \\ \Delta \dot{y}_i \\ \Delta \dot{z}_i \end{bmatrix} \qquad \text{EQN. 6}$$

$$\Delta s = \begin{bmatrix} \Delta x^s \\ \Delta y^s \\ \Delta z^s \\ \Delta \alpha^s \\ \Delta \delta^s \\ \Delta \gamma^s \end{bmatrix} \qquad \text{EQN. 7}$$

where $\Delta p$ is a block that includes all parameters associated with n features and $\Delta s$ is a block that includes 6 sensor parameters (3 parameters for sensor positions in the absolute coordinate system and 3 parameters for LOS: azimuth, elevation, rotation). Sub-blocks of the block $\Delta p$ can correspond to stationary ($\Delta p_i^{stat}$) or moving ($\Delta p_i^{mov}$) features. Correspondingly, in the first case the sub-bloc includes 3 positions of a feature in 3D (x, y, z); in the second case, the sub-block includes the 3 x-y-z parameters as well as 3 velocities for the moving feature.

The matrix $\Phi(t, \Delta t)$ is the transition matrix that includes the diagonal blocks for features, sensor positions and LOS. Correspondingly, the blocks for the stationary features are unitary matrices of the size [3×3], the blocks for the moving targets are the transition matrices for linear motion [6×6], and the blocks for the sensor's parameters are the scalars corresponding to the $1^{st}$ order Markov processes. The matrix F(t) is the projection matrix that maps system's disturbances $\xi(t)$ into the space of the state-vector $\Delta X_\Sigma$. The vector of disturbances $\xi(t)$ comprises the Gaussian white noises for the $1^{st}$ order Markov shaping filters in the equations of moving targets and sensor's parameters (positions and LOS). The vector $\xi(t)$ has the zero mean and the covariance matrix $D_\xi$.

The measurement vector $\Delta Y_\Sigma$ at each frame includes the following blocks:

$$\Delta Y_\Sigma = \begin{bmatrix} \Delta q_1 \\ \vdots \\ \Delta q_n \end{bmatrix} \qquad \text{EQN. 8}$$

$$\Delta q_i = \begin{bmatrix} \Delta q_i^{VG} \\ \Delta q_i^{VGR} \end{bmatrix} \qquad \text{EQN. 9}$$

$$\Delta q_i^{VG} = \begin{bmatrix} \Delta x_i^{VG} \\ \Delta y_i^{VG} \end{bmatrix} \qquad \text{EQN. 10}$$

$$\Delta q_i^{VGR} = \begin{bmatrix} \Delta x_i^{VGR} \\ \Delta y_i^{VGR} \end{bmatrix} \qquad \text{EQN. 11}$$

where block $\Delta q_i$ corresponds to the i-th feature (out of n) and comprises the two sub-blocks: 1) $\Delta q_i^{VG}$ which includes two components for the virtual gyro (VG) measurement (feature position); and, 2) $\Delta q_i^{VGR}$ which includes two components for the virtual gimbal resolver (VGR) measurement (feature velocity). In both cases (VG and VGR), the two measurement components are the x and y positions of the features in the focal plane.

In the linearized measurement model, the matrix H(t) is the sensitivity matrix that formalizes how the measurements depend on the state-vector components. The vector $\eta(t)$ is the measurement noise vector which is assumed to be Gaussian with zero mean and the covariance matrix $D_\eta$. The measurement noise for the virtual gyro and virtual gimbal resolver is a result of the feature registration errors. In one experiment, the registration errors for one set of data was not Gaussian and were also correlated in time. In some embodiments, for the simplicity of formulating the filtering algorithm, the method involves assuming Gaussian uncorrelated noise in which the variances are large enough to make the system performance robust.

After the dynamics model and measurement models are generated, the estimation module 240 constructs a standard Extended Kalman Filter (EKF) to propagate the estimates of the state-vector and associated covariance matrix in accordance with:

$$\Delta X_\Sigma^*(t) = \Delta \hat{X}_\Sigma(t) + P^*(t)H^T(t)D_\eta^{-1}[\Delta Y_\Sigma(t) - H^T(t)\Delta \hat{X}_\Sigma(t)] \quad \text{EQN. 12}$$

$$P^*(t) = \hat{P}(t) - \hat{P}(t)H^T(t)[D_\eta^{-1} + H(t)\hat{P}(t)H^T(t)]^{-1}H(t)\hat{P}(t) \quad \text{EQN. 13}$$

$$\Delta \hat{X}_\Sigma(t+\Delta t) = \Phi(t,\Delta t)\Delta X_\Sigma^*(t) \quad \text{EQN. 14}$$

$$\hat{P}(t+\Delta t) = \Phi(t,\Delta t)P^*(t)\Phi^T(t,\Delta t) + F(t)D_\xi F^T(t) \quad \text{EQN. 14}$$

where, at the processing step of the EKF the a posteriori statistics are generated: $\Delta X_\Sigma^*$—the a posteriori estimate of the state-vector $\Delta X_\Sigma$, and $P^*$—the associated a posteriori covariance matrix. Correspondingly, at the prediction step of the EKF the a priori statistics are generated: $\Delta \hat{X}_\Sigma(t+\Delta t)$—the a priori estimate of the state-vector $\Delta X_E$, and $\Delta \hat{P}(t+\Delta t)$—the associated a priori covariance matrix.

The EKF filtering algorithm manages a variable set of features which are being processed from frame to frame. In particular, it adds to the extended state-vector $\Delta X_\Sigma$ new features which come into the sensor's field of view and excludes past features that are no longer in the field of view. The features no longer in the field of view are maintained in the filter for some specified time since they continue contributing to the estimation of features in the field of view. This time is determined by the level of reduction in the elements of the covariance matrix diagonal due to accounting for the feature; it is a trade-off between the accuracy in feature locations and the memory speed requirements. The filtering algorithm also manages a large covariance matrix (e.g., the a posteriori matrix $P^*(t)$ and the a priori matrix $\Delta \hat{P}(t+\Delta t)$) in the case of a large number of features, for example, 100-1000's of features). The method maintains correlations in the covariance matrix that have the largest relative effect. The correlations are identified in the process of generating this matrix that is a product of the covariance vector (between each measurement and the state-vector) and the transpose of this vector: $P=VV^T$. The algorithm is based on computing first correlations in the covariance vector and then using a correlation threshold for pair-wise multiplications to identify the essential correlations in the covariance matrix. Selection of the elements in the covariance matrix helps to significantly reduce computational time and memory consumptions by the EKF.

Figure 5:
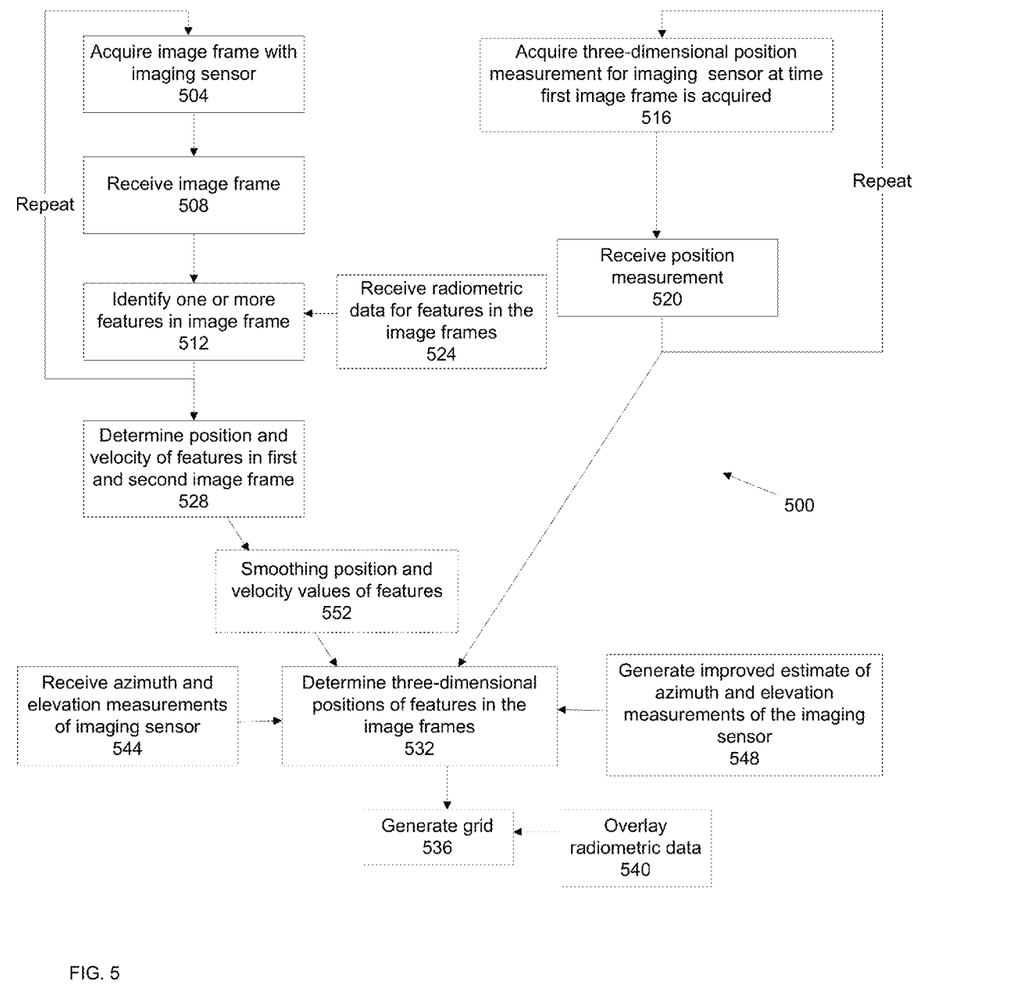
FIG. 5 is a flowchart of a method for locating features in a field of view of an imaging sensor, according to an illustrative embodiment.

FIG. 5 is a flowchart 500 of a method for locating features in a field of view of an imaging sensor. The method includes acquiring an image frame 504 from the field of view of an imaging sensor at a first time. The acquired image frame is then received 508 by, for example, a processor for further processing. The method then involves identifying one or more features in the image frame 512. The features are identified using any one of a variety of suitable methods (e.g., as described above with respect to FIGS. 2 and 3). The method also includes acquiring a three-dimensional position measurement 516 for the imaging sensor at the first time. The three-dimensional position measurement is acquired relative to an absolute coordinate system (e.g., global X,Y,Z coordinates). The acquired image frame and the acquired position measurement are then received 520 by the processor for further processing. Each of steps 504, 508, 512, 516, and 520 are repeated at least one additional time such that a second image frame and second three-dimensional position measurement are acquired at a second time.

After at least two image frames have been acquired, the method includes determining the position and velocity of features in the image frames 528 using, for example, the feature selection module 304 and tracking module 308 of FIG. 3. The method also includes determining the three-dimensional positions of the features in the image frames 532 based on the position and velocity of the features in the image frames and the three dimensional position measurements for the imaging sensor acquired with respect to step 516. In some embodiments, the position and velocity values of the features are smoothed 552 to reduce measurement errors prior to performing step 532.

In some embodiments, the method includes using azimuth and elevation measurements acquired for the imaging sensor 544 in determining the three-dimensional positions of the features in the image frames. Improved azimuth and elevation measurements can be generated 548 for the imaging sensor based on the three-dimensional positions of the features. This can be accomplished by the algorithms described above since the state-vector includes both three-dimensional coordinates of features and sensor characteristics (its position and the azimuth-elevation of the line of sight). Correspondingly, accurate knowledge of feature positions is directly transferred to accurate knowledge of the sensor position and line of sight.

In some embodiments, the method includes generating a three-dimensional grid 536 over one or more of the image frames based on the three-dimensional positions of features in the image frames. In some embodiments, the three-dimensional grid is constructed by using the features as the cross section of perpendicular lines spanning the field of view of the image frames. In some embodiments, this is done via Delaunay triangulation of the feature positions and then via interpolation of the triangulated surface by a regular latitude-longitude-altitude grid. In some embodiments, the method also includes receiving radiometric data 524 for features in the image frames. The radiometric data (e.g., color of features, optical properties of features) can be acquired when the image frames are acquired.

Figure 6:
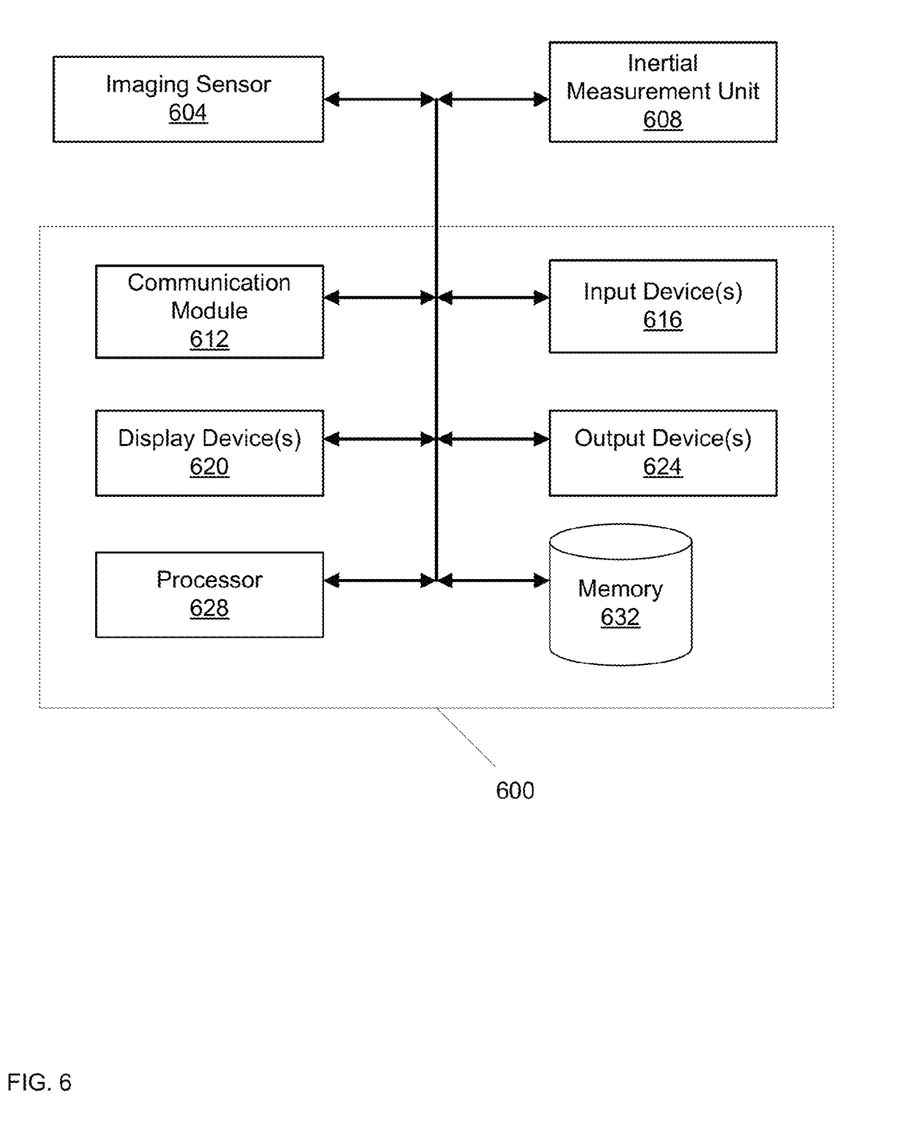
FIG. 6 is a block diagram of a computing device used with a system for locating features in the field of view of an imaging sensor, according to an illustrative embodiment.

FIG. 6 is a block diagram of a computing device 600 used with a system for locating features in the field of view of an imaging sensor (e.g., system 100 of FIG. 1). The computing device 600 includes one or more input devices 616, one or more output devices 624, one or more display devices(s) 620, one or more processor(s) 628, memory 632, and a communication module 612. The modules and devices described herein can, for example, utilize the processor 628 to execute computer executable instructions and/or the modules and devices described herein can, for example, include their own processor to execute computer executable instructions. It should be understood the computing device 600 can include, for example, other modules, devices, and/or processors known in the art and/or varieties of the described modules, devices, and/or processors.

The communication module 612 includes circuitry and code corresponding to computer instructions that enable the computing device to send/receive signals to/from an imaging sensor 604 (e.g., imaging sensor 104 of FIG. 1) and an inertial measurement unit 608 (e.g., inertial measurement unit 108 of FIG. 1). For example, the communication module 612 provides commands from the processor 628 to the imaging sensor to acquire video data from the field of view of the imaging sensor. The communication module 612 also, for example, receives position data from the inertial measurement unit 608 which can be stored by the memory 632 or otherwise processed by the processor 628.

The input devices 616 receive information from a user (not shown) and/or another computing system (not shown). The input devices 616 can include, for example, a keyboard, a scanner, a microphone, a stylus, a touch sensitive pad or display. The output devices 624 output information associated with the computing device 600 (e.g., information to a printer, information to a speaker, information to a display, for example, graphical representations of information). The processor 628 executes the operating system and/or any other computer executable instructions for the computing device 600 (e.g., executes applications). The memory 632 stores a variety of information/data, including profiles used by the computing device 600 to specify how the spectrometry system should process light coming into the system for imaging. The memory 632 can include, for example, long-term storage, such as a hard drive, a tape storage device, or flash memory; short-term storage, such as a random access memory, or a graphics memory; and/or any other type of computer readable storage.

The above-described systems and methods can be implemented in digital electronic circuitry, in computer hardware, firmware, and/or software. The implementation can be as a computer program product that is tangibly embodied in non-transitory memory device. The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors, or one or more servers that include one or more processors, that execute a computer program to perform functions of the disclosure by operating on input data and generating output. Method steps can also be performed by, and an apparatus can be implemented as, special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data. Magnetic disks, magneto-optical disks, or optical disks are examples of such storage devices.

Data transmission and instructions can occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A method for high-precision geolocation of stationary or moving targets, the method comprising:
   receiving a first image frame for a field of view of an imaging sensor at a first time;
   receiving a three-dimensional position measurement, in an absolute coordinate system, for the imaging sensor at the first time;
   identifying one or more features representative of a target in the first image frame;
   receiving a second image frame for the field of view of the imaging sensor at a second time;
   receiving a three-dimensional position measurement, in the absolute coordinate system, for the imaging sensor at the second time;
   identifying one or more features representative of the target in the second image frame;
   determining position and velocity of one or more of the identified features in the first and second image frames; and
   determining a three-dimensional position of the target based at least in part on (i) the received three-dimensional position measurements for the imaging sensor at the first and second times and (ii) the position and velocity of the one or more of the identified features in the first and second image frames.

2. The method of claim 1, wherein the determining the three-dimensional position of the target includes using a non-linear estimation method.

3. The method of claim 1, wherein one or more features identified in the second image frame were not identified in the first image frame.

4. The method of claim 1, wherein one or more of the one or more targets are moving with respect to the absolute coordinate system.

5. The method of claim 1, comprising generating a three-dimensional latitude-longitude-altitude grid over the second image frame based on the three-dimensional positions of features or targets in the second image.

6. The method of claim 1, further comprising receiving line-of-sight data for the imaging sensor at the first time and receiving line-of-sight data for the imaging sensor, wherein the determining the three-dimensional position of the target is further based on the line-of-sight data for the imaging sensor.

7. The method of claim 5, comprising receiving radiometric data for one or more features and overlaying the radiometric data on the three-dimensional grid.

8. The method of claim 1, further comprising:
receiving a third image frame for the field of view of the imaging sensor at a third time;
identifying one or more features representative of the target in the third image frame; and
determining position and velocity of one or more of the identified features in the third image frame;
wherein the determining three-dimensional positions of the target is further based on the position and velocity of the one or more of the identified features in the third image frame.

9. The method of claim 1, further comprising smoothing the position and velocity values of the one or more of the identified features in the first and second image frames to reduce measurement errors prior to the determining the three-dimensional positional position of the target.

10. A system for high-precision geolocation of stationary or moving targets the system comprising:
a processor; and
non-transient memory, the memory including code representing instructions that when executed cause the processor to:
receive a first image frame for a field of view of an imaging sensor at a first time;
receive a three-dimensional position measurement, in the absolute coordinate system, for the imaging sensor at the first time;
identify one or more features representative of a target in the first image frame;
receive a second image frame for the field of view of the imaging sensor at a second time;
receive a three-dimensional position measurement, in the absolute coordinate system, for the imaging sensor at the second time;
identify one or more features representative of the target in the second image frame;
determine position and velocity of one or more of the identified features in the first and second image frames; and
determine a three-dimensional position of the target based, at least in part on (i) the received three-dimensional position measurements for the imaging sensor at the first and second times and (ii) the position and velocity of the one or more of the identified features in the first and second image frames.

11. The system of claim 10, wherein the determining the three-dimensional positions of the target includes using a non-linear estimation method.

12. The system of claim 10, wherein the non-transient memory includes code representing instructions that when executed further cause the processor to generate a three-dimensional latitude-longitude-altitude grid over the second image frame.

13. The system of claim 10, wherein the non-transient memory includes code representing instructions that when executed further cause the processor to receive line-of-sight data for the imaging sensor, wherein the determining the three-dimensional position of the target is further based on the line-of-sight data for the imaging sensor.

14. The system of claim 12, wherein the non-transient memory includes code representing instructions that when executed further cause the processor to receive radiometric data for one or more features and overlay the radiometric data on the three-dimensional grid.

15. The system of claim 10, wherein the memory includes code representing instructions that when executed further cause the processor to smooth the position and velocity values of the one or more of the identified features in the first and second image frames to reduce measurement errors prior to the determining the three-dimensional position of the target.

16. A method for high-precision geolocation of stationary or moving targets, the method comprising:
receiving image data from the field of view of an imaging sensor, wherein the image data includes a plurality of image frames and each image frame is acquired at a different point in time;
receiving three-dimensional position measurements, in an absolute coordinate system, for the imaging sensor at the point in time each image frame is acquired;
identifying one or more features representative of a target in the image frames;
determining position and velocity of one or more of the identified features in the image frames; and
determining a three-dimensional position of the target based at least in part on (i) the received three-dimensional position measurements for the imaging sensor and (ii) the position and velocity of the one or more of the identified features in the image frames.

17. The method of claim 6, wherein the light of sight data for the imaging sensor includes azimuth and elevation measurements of the imaging sensor relative to one or more of the features in an image frame.

18. The method of claim 1, wherein the velocity of the one or more of the identified features in the first and second image frames is based on changes in position of the one or more of the identified features as between the first and second image frames.

19. The method of claim 18, wherein the changes in position of the one or more of the identified features are changes in planer position in the focal plane of the imaging sensor.

20. The method of claim 1, wherein the velocity is a planer velocity in the focal plane off the imaging sensor.

21. The method of claim 1, wherein the velocity of the one or more of the identified features accounts for velocity the target moving independent of the change of position of the imaging sensor.

22. The system of claim 13, wherein the line of sight data for the imaging sensor includes azimuth and elevation measurements of the imaging sensor relative to one or more of the features in an image frame.

* * * * *